(12) United States Patent
Wade et al.

(10) Patent No.: US 11,701,801 B2
(45) Date of Patent: Jul. 18, 2023

(54) CAUL PLATE WITH FEATURE FOR SEPARATING FROM COMPOSITE PART

(71) Applicant: The Boeing Company, Chicago, IL (US)

(72) Inventors: Daniel J. Wade, Carbonado, WA (US); Mathew K. Lathrop, Orting, WA (US)

(73) Assignee: The Boeing Company, Chicago, IL (US)

( * ) Notice: Subject to any disclaimer, the term of this patent is extended or adjusted under 35 U.S.C. 154(b) by 495 days.

(21) Appl. No.: 16/291,535

(22) Filed: Mar. 4, 2019

(65) Prior Publication Data

US 2020/0282669 A1    Sep. 10, 2020

(51) Int. Cl.

| | |
|---|---|
| *B64C 3/18* | (2006.01) |
| *B29C 37/00* | (2006.01) |
| *B29C 70/44* | (2006.01) |
| *B29C 33/38* | (2006.01) |
| *B29C 70/54* | (2006.01) |
| *B29C 70/68* | (2006.01) |
| *B29L 31/30* | (2006.01) |
| *B29C 43/36* | (2006.01) |

(52) U.S. Cl.
CPC ...... *B29C 37/0003* (2013.01); *B29C 33/3842* (2013.01); *B29C 70/443* (2013.01); *B29C 70/541* (2013.01); *B29C 70/542* (2013.01); *B29C 70/549* (2021.05); *B29C 70/681* (2013.01); *B29C 2043/3655* (2013.01); *B29L 2031/3076* (2013.01); *B64C 3/18* (2013.01)

(58) Field of Classification Search
CPC ....... B29C 70/443; B29C 70/54; B29C 70/44; B29C 70/451; B29C 70/543; B29C 70/48; B29C 70/342; B32B 37/10; B65H 29/00; B65H 43/00
See application file for complete search history.

(56) References Cited

U.S. PATENT DOCUMENTS

| | | | | |
|---|---|---|---|---|
| 2,614,590 A | * | 10/1952 | Hervey | B30B 15/062 100/324 |
| 2,907,479 A | * | 10/1959 | Cunningham | B30B 7/02 414/280 |
| 3,795,559 A | * | 3/1974 | Horn | B29C 70/342 156/152 |
| 3,935,049 A | * | 1/1976 | Schmidt | E04C 2/26 156/216 |
| 4,942,013 A | * | 7/1990 | Palmer | B29C 70/549 264/511 |
| 5,746,553 A | * | 5/1998 | Engwall | B29C 70/545 409/132 |
| 6,431,850 B1 | * | 8/2002 | Evans | B29C 70/549 425/470 |
| 6,565,690 B1 | * | 5/2003 | Cerezo Pancorbo | B29C 70/44 156/196 |

(Continued)

*Primary Examiner* — Joseph S Del Sole
*Assistant Examiner* — Margaret B Hayes
(74) *Attorney, Agent, or Firm* — Duft & Bornsen, PC (57) ABSTRACT

Systems and methods are provided for a caul plate having a feature for removal. One embodiment is a caul plate for forming a composite part. The caul plate includes a body that includes a lower surface which faces the composite part, and an upper surface that is opposite to the lower surface. The caul plate also includes a groove in the upper surface to accept a tool to slide the caul plate laterally from the composite part.

26 Claims, 5 Drawing Sheets

(56) References Cited

U.S. PATENT DOCUMENTS

| | | | | |
|---|---|---|---|---|
| 2008/0283177 A1* | 11/2008 | Glain | ................. | B29C 70/44 |
| | | | | 52/127.3 |
| 2010/0314042 A1* | 12/2010 | Luebbering | ............ | B29C 33/405 |
| | | | | 156/286 |
| 2011/0139344 A1* | 6/2011 | Watson | ................. | B29C 73/32 |
| | | | | 156/499 |
| 2012/0258276 A1* | 10/2012 | Modin | ................. | B29C 70/443 |
| | | | | 428/98 |
| 2013/0299073 A1* | 11/2013 | Piedmont | ............... | B29C 70/44 |
| | | | | 156/60 |
| 2015/0102535 A1* | 4/2015 | Lutz | ................. | B29C 70/549 |
| | | | | 264/553 |
| 2016/0121553 A1* | 5/2016 | Paesano | ............... | B29C 70/541 |
| | | | | 264/258 |
| 2016/0158977 A1* | 6/2016 | Ross | ................. | B29C 70/44 |
| | | | | 52/127.3 |
| 2016/0375631 A1* | 12/2016 | Encinosa | ............ | B29D 99/0014 |
| | | | | 156/91 |
| 2017/0057182 A1* | 3/2017 | Bernetich | ............... | B29C 70/44 |
| 2019/0111637 A1* | 4/2019 | Hanna | ................. | B29C 73/02 |

* cited by examiner

CAUL PLATE WITH FEATURE FOR SEPARATING FROM COMPOSITE PART

FIELD

The disclosure relates to the field of composite parts, and in particular, to caul plates for composite parts.

BACKGROUND

Aircraft parts, such as wing components, often comprise composite parts made by a resin infusion process in which a stack of porous material (known as a preform) is filled with a liquid resin. After infusion, the resin matrix is cured to solidify the combined material into a unified rigid composite. The result is a cost-effective way of manufacturing structural materials that exhibit enhanced physical characteristics (e.g., strong, lightweight, resistive to harsh environments, etc.) useful for high-performance applications such as aerospace.

Composite fabrication systems often use caul plates during fabrication to shape the preform and provide a smooth, aerodynamic surface on the finished part. However, caul plates are difficult to separate from the finished part without damaging the part. Caul plates are typically flat and featureless, and often get resin build up around its edge from the fabrication process. Current techniques for removing the caul plate thus include prying, lifting, twisting, hammering, and pulling with fingertips. Due to the force needed to dislodge the caul plate from the composite part, these techniques pose safety and ergonomic issues and create a risk of delaminating or causing other types of damage to the part.

SUMMARY

Embodiments described herein provide a caul plate having an integrated feature for removing the caul plate from a composite part. The feature may comprise a groove, hole, or member configured to receive a lateral mechanical force for release and removal of the caul plate from a composite part, such as a stringer of an aircraft. For instance, a groove in the top surface of the caul plate may enable a tool head to apply sufficient lateral force for dislodging the caul plate in a sliding motion without rotating the caul plate upwards during removal. The feature therefore provides a technical benefit in enabling the caul plate to slide off the composite part without causing delamination or damage to the composite part.

One embodiment is an apparatus including a caul plate for forming a composite part. The caul plate includes a body that includes a lower surface which faces the composite part, and an upper surface that is opposite to the lower surface. The caul plate also includes a groove in the upper surface to accept a tool to slide the caul plate laterally from the composite part.

One embodiment is a method of using a caul plate to fabricate a composite part. The method includes machining a groove into an upper surface of the caul plate sized to receive a head of a tool, positioning a lower surface of the caul plate on top of a preform, and curing the preform into the composite part. The method also includes inserting the tool into the groove in the upper surface of the caul plate, and removing the caul plate from the composite part by actuating the tool laterally to slide the caul plate off the composite part.

Another embodiment is an apparatus including a caul plate for a composite part. The caul plate includes a body that includes a lower surface which faces the composite part, and an upper surface that is opposite to the lower surface, a structural member protruding from the upper surface, and a hole in the structural member to receive a tool to slide the caul plate laterally from the composite part.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
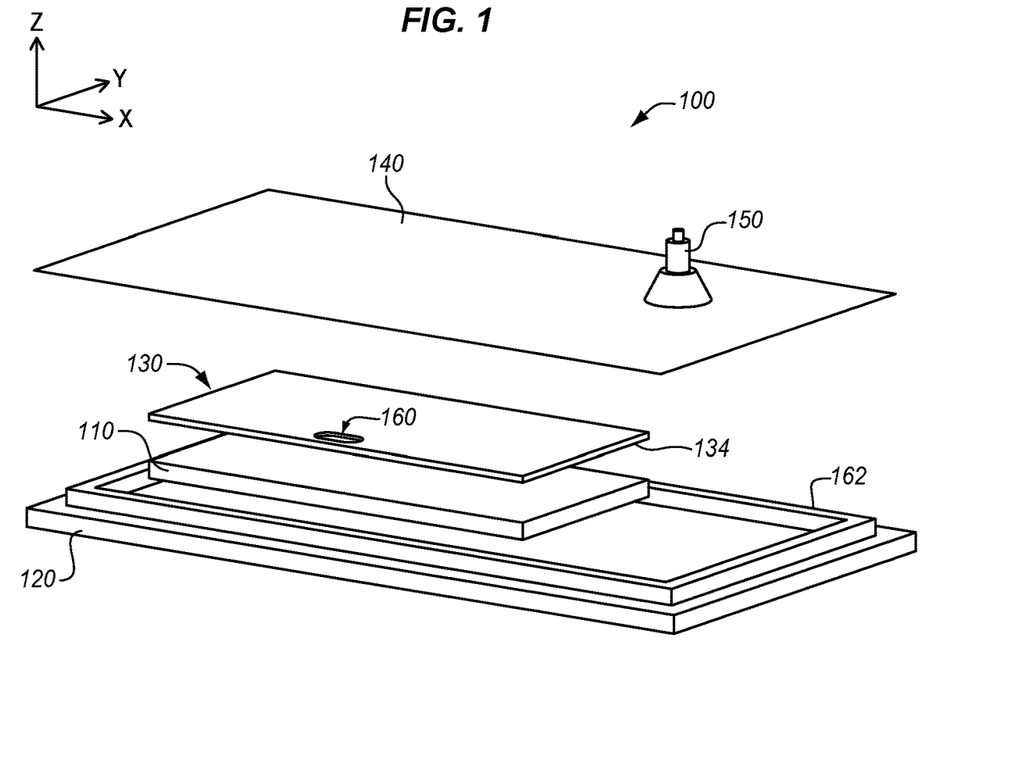
FIG. 1 is a perspective exploded view of a composite fabrication system in an illustrative embodiment.

FIG. 1 is a perspective exploded view of a composite fabrication system 100 in an illustrative embodiment. The composite fabrication system 100 is configured to manufacture composite structures, such as a composite part of an aircraft. In doing so, the composite fabrication system 100 applies heat and pressure to infuse a resin into a preform 110. After the resin is infused, the composite fabrication systems 100 cures the preform 110 into a hardened structure, creating the desired composite part.

Generally, the composite fabrication system 100 includes a tool mandrel 120, a caul plate 130, a vacuum bag 140, and one or more pressure source(s) 150. The preform 110 may include layers or plies of fibers, such as carbon fibers or fiberglass fibers, that are laid-up on the tool mandrel 120 and placed under the caul plate 130. The tool mandrel 120 (sometimes referred to as a mandrel, mold tool, or forming tool) thus provides a base or surface which supports the preform 110, and may form an Inner Mold Line (IML) for the preform 110. The caul plate 130 defines a surface shape for the other side of the preform 110, and may form an Outer Mold Line (OML) for the preform 110.

The vacuum bag 140 seals to the tool mandrel 120 via sealing tape 162, and encloses the preform 110 to form a chamber. The pressure source 150 (e.g., vacuum pump) creates a pressure differential in the chamber to draw resin into the preform 110. After the preform 110 is sufficiently infused with the resin, the preform 110 may be cured with a curing temperature and pressure to form the composite part.

In current fabrication systems, the caul plate is difficult to remove from the composite part without causing damage to the composite part. Caul plates are typically flat and featureless, and therefore are removed from the part after cure by prying edges of the caul plate upward (e.g., in the z-direction) with fingertips. Unfortunately, this prying movement can cause edges of the caul plate to damage the composite part.

The composite fabrication system 100 and the caul plate 130 are therefore enhanced with a groove 160 in the caul plate 130 configured to receive a tool for sliding the caul plate 130 laterally from the composite part. The groove 160 is an indentation in an upper surface 132, or bag side, of the caul plate 130 sized to accept the end or head of the tool. The upper surface 132 is opposite to a lower surface 134, or part side, which faces the composite part. The groove 160 provides in a technical benefit in enabling the caul plate 130 to be gripped at the upper surface 132 for sliding the lower surface 134 of the caul plate 130 laterally off the composite part. Advantageously, the lower surface 134 of the caul plate 130 need not be rotated upward during removal. The groove 160 thus enables the caul plate 130 to be removed from the composite part without any risk of damage to the composite part.

Although the caul plate 130 is shown and described with respect to the composite fabrication system 100, it will be appreciated that the caul plate 130 may be used in any number of alternative composite fabrication processes and resin distribution systems, including pre-preg processes where the fiber material is pre-impregnated with resin. In such instances, the resin may be at room temperature for a period of time before initiating the cure process. Additionally, the composite fabrication system 100 may include various consumable items not shown for ease of illustration, such as a peel ply, vacuum lines, breathers, etc., that may be removed and disposed after demold. Additional examples of components not shown include a resin distribution medium having a permeable membrane to enable the resin to flow and distribute into the preform 110. It will also be appreciated that alternative types and configurations of components, such as additional vacuum bags and alternative types of sealing members, are also possible.

Figure 2:
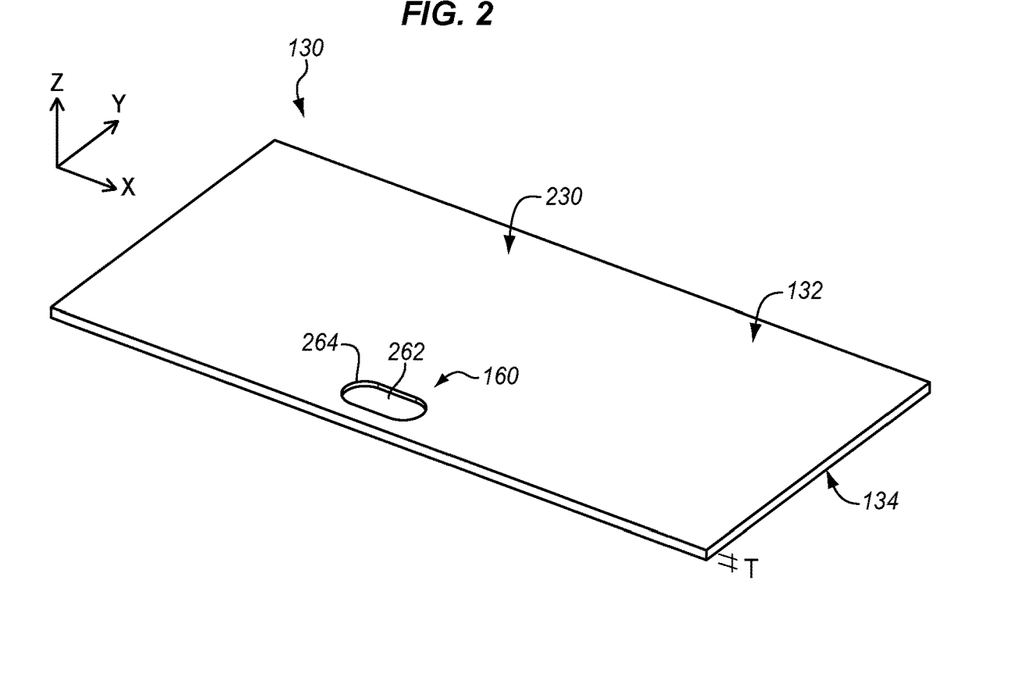
FIG. 2 is a perspective view of a caul plate in an illustrative embodiment

FIG. 2 is a perspective view of the caul plate 130 in an illustrative embodiment. As shown in FIG. 2, the caul plate 130 includes a body 230, which is shaped to a desired contour for a composite part. For example, the body 230 may be shaped flat, curved along one dimension, curved along multiple dimensions (e.g., in a complex contour), etc.

The body 230 includes the lower surface 134 which faces the composite part, and the upper surface 132 that is opposite to the lower surface 134. The lower surface 134 conforms against the preform and defines a contour for the preform (e.g., an Outer Mold Line (OML), while the upper surface 132 does not. The lower surface 134 may define an aerodynamically smooth surface contour (e.g., a contour having surface or finish that results in a roughness of less than two hundred and fifty μinch Ra).

The body 230 may be shaped from a rigid or flexible sheet of material having a thickness T. For instance, caul plate 130 may be made from any suitable rigid material, such as steel, aluminum, etc. In some embodiments, the caul plate 130 is made from an elastically deformable shape memory material, such as spring steel. In still further embodiments, caul plate 130 may itself be made of a composite material.

The groove 160 is an indentation in the upper surface 132 configured to mechanically couple the caul plate 130 with a tool for movement in a lateral direction (e.g., in the x-y plane). The groove 160 includes a floor 262 and walls 264 having a shape to receive a head of the tool. The floor 262 is sunken into the upper surface 132 for a distance less than the thickness T of the body 230. The groove 160 therefore does not affect the lower surface 134 for shaping the composite part. The walls 264 transfer a lateral force of the tool to the caul plate 130. As described in greater detail below, the groove 160, including the floor 262 and the walls 264, may have a shape that matches or corresponds with a shape of a head of a tool.

Figure 3:
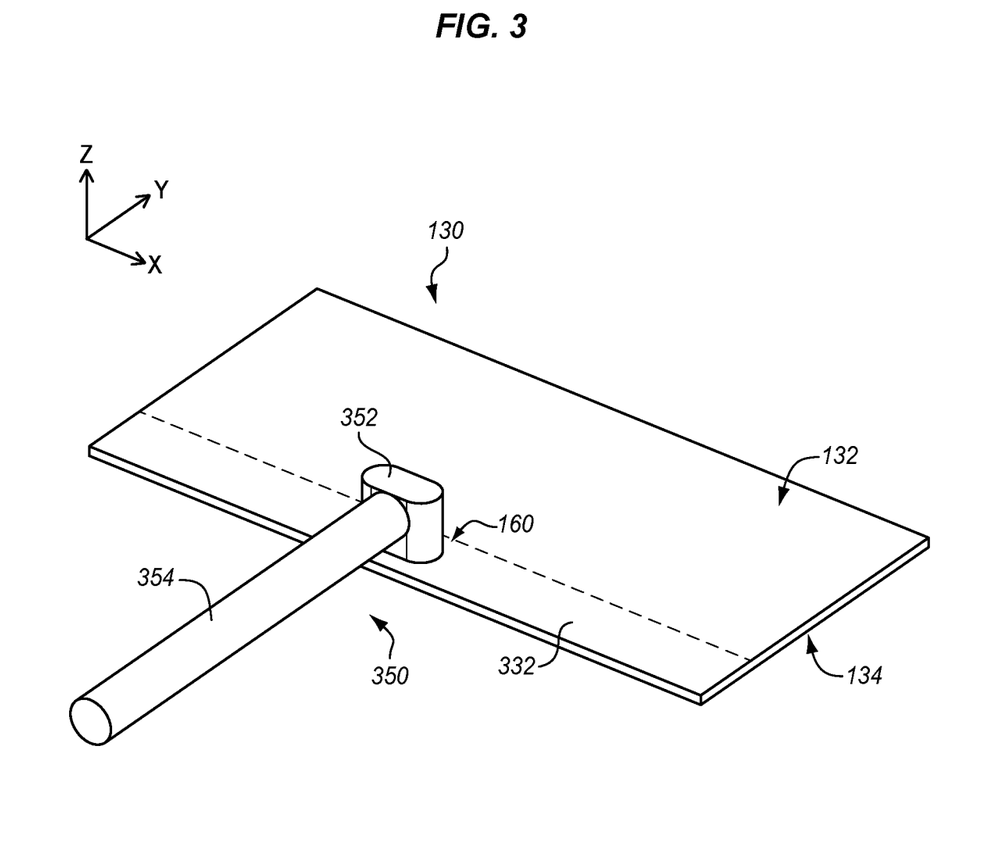
FIG. 3 is a perspective view of a caul plate coupled with a tool in an illustrative embodiment.

FIG. 3 is a perspective view of the caul plate 130 coupled with a tool 350 in an illustrative embodiment. The tool 350 includes a head 352 to fit in the groove 160, and a shank 354 attached to the head 352 to pull the caul plate 130 laterally (e.g., in the x-y plane). The head 352 couples with the upper surface 132 of the caul plate 130 by inserting the head 352 perpendicularly (e.g., in the z-direction) into the groove 160. The walls 264 (not shown in FIG. 3) of the groove 160 may be sized with a height and shaped with a perimeter that corresponds with the head 352 to minimize potential for slippage when pulling the tool 350 in the groove 160.

In some embodiments, the groove 160 is machined in the upper surface 132 at a location near an edge of the caul plate 130 for coupling and pulling the tool 350 from that edge. For example, the caul plate 130 may include a tapered edge 332 where the upper surface 132 declines toward the composite part toward its end. The groove 160 may be disposed partially or entirely in a region of the tapered edge 332, as indicated by the dashed line in FIG. 3. Accordingly, the tool 350 couples and pulls from the tapered edge 332 of the upper surface 132, as indicated by the arrow in FIG. 3. The tool 350 may be actuated by a manual force gripping the shank 354. Alternatively, the shank 354 may couple with machinery for actuating the tool 350.

It will be appreciated that the tool 350 and the groove 160 shown in FIGS. 2-3 are examples for purposes of illustration and that alternative corresponding shapes and sizes thereof are possible. For example, the tool 350 may include a flange lock nut as the head 352 and a wrench as the shank 354. Alternatively or additionally, the tool 350 may include a block, pin, or plug as the head 352, and the groove 160 may comprise a corresponding hole indentation to fit the head 352. In another example, the tool 350 may comprise a slide hammer.

Figure 4:
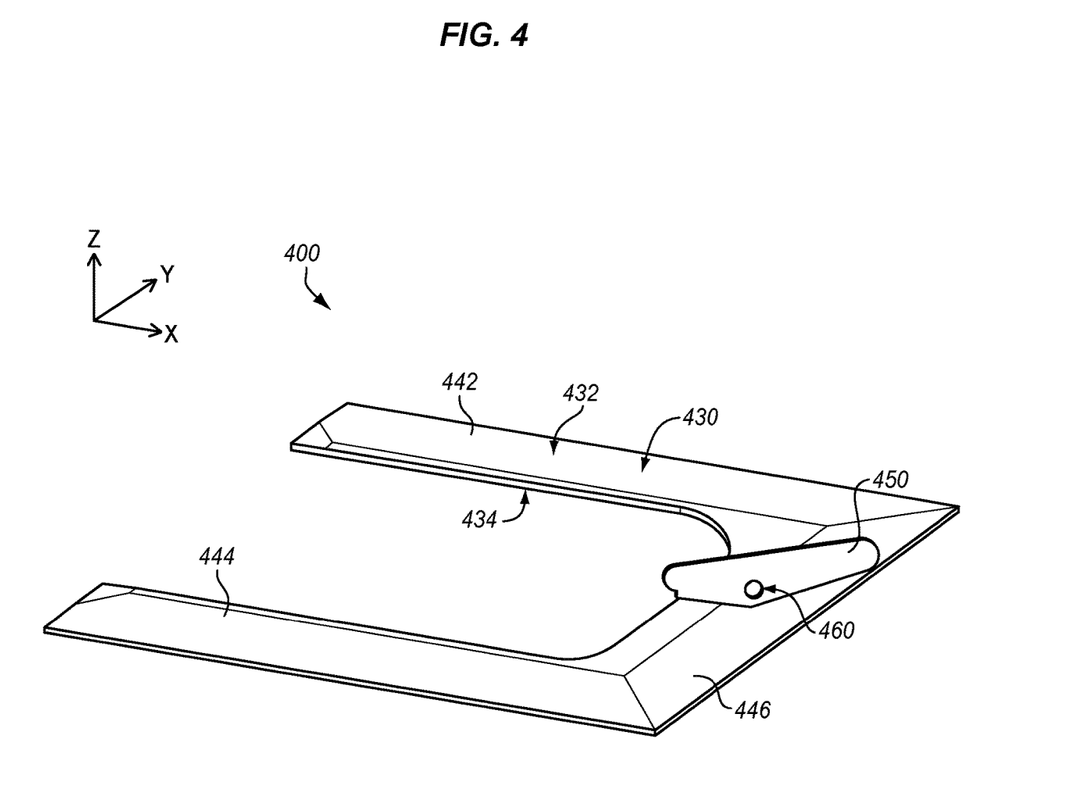
FIG. 4 is a perspective view of a caul plate in another illustrative embodiment.

FIG. 4 is a perspective view of a caul plate 400 in another illustrative embodiment. The caul plate 400 includes a body 430 having a lower surface 434 which faces the composite part, and an upper surface 432 that is opposite to the lower surface 434. Additionally, as shown by this example, the body 430 is U-shaped or horse shoe shaped with side members 442-444 and a base member 446 forming the structure. The body 430 also includes a structural member 450 protruding from the upper surface 432. In some embodiments, the structural member 450 includes a male pad-up/ block feature attached to the upper surface 432 and configured to receive a lateral force for removing the caul plate 400 from the composite part. The structural member 450 may be integrated with the body 430 of the caul plate 400. The structural member 450 may be formed of a rigid material and/or a same material as that of the body 430.

Alternatively or additionally, as shown in FIG. 4, the structural member 450 may comprise a fin protruding vertically from the base member 446 to align with a stringer of an aircraft. The structural member 450, or fin, may include a hole 460 through its structure to receive a tool 350 to slide the caul plate 400 laterally from the composite part. For example, the tool 350 may include a hook or pin to insert through the hole 460 to pull the caul plate 400 laterally. Thus, the caul plate 400 of this example, including a U-shaped body and fin, is configured to shape a composite part comprising a stringer of an aircraft. Like the caul plate 130 described in FIGS. 1-4, the caul plate 400 may be used in any number of composite fabrication processes and resin distribution systems, and may comprise alternative shapes, location/configuration of structural member, hole, etc.

Figure 5:
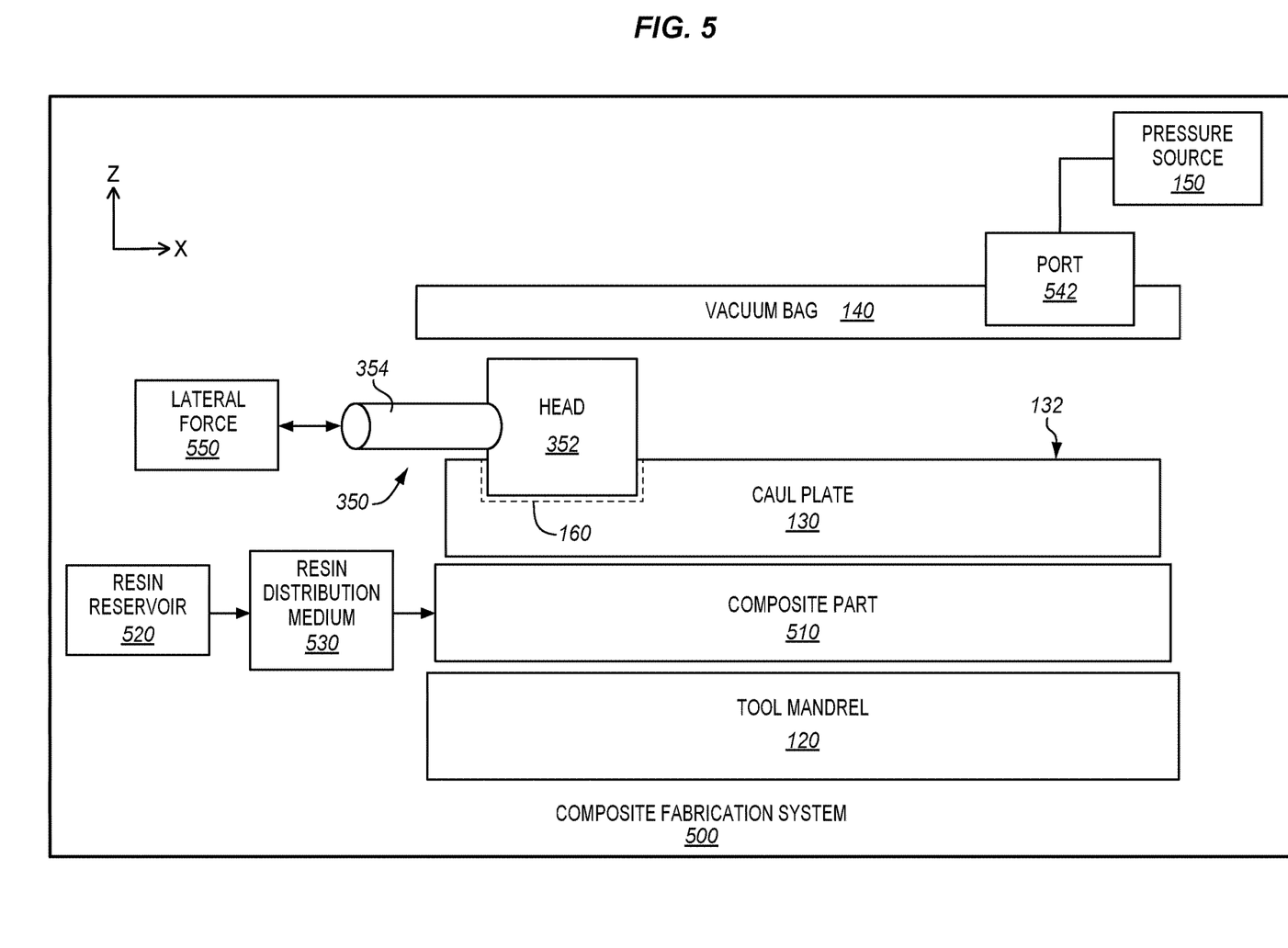
FIG. 5 is a block diagram of a composite fabrication system in an illustrative embodiment.

FIG. 5 is a block diagram of a composite fabrication system 500 in an illustrative embodiment. As shown in FIG. 5, the caul plate 130 is disposed above the composite part 510. The composite part 510 is formed by applying pressure with the pressure source 150 coupled with a port 542 in the vacuum bag 140 to draw resin from a resin reservoir 520 via a resin distribution medium 530. During infusion/cure of the composite part 510, the groove 160 in the caul plate 130 faces the vacuum bag 140 but is advantageously sunken in the upper surface 132 and therefore does not risk puncturing the vacuum bag 140.

After infusion/cure of the composite part 510, the vacuum bag 140 is removed and the tool 350 couples to the caul plate 130 with the head 352 situated in the groove 160. The shank 354 is pushed or pulled with a lateral force 550 to slide the caul plate 130 off the composite part 510. The caul plate 130 is thus removed from the composite part 510 without damaging the composite part 510. Alternatively or additionally, the upper surface 132 may include a structural member and hole for coupling with the lateral force 550.

Figure 6:
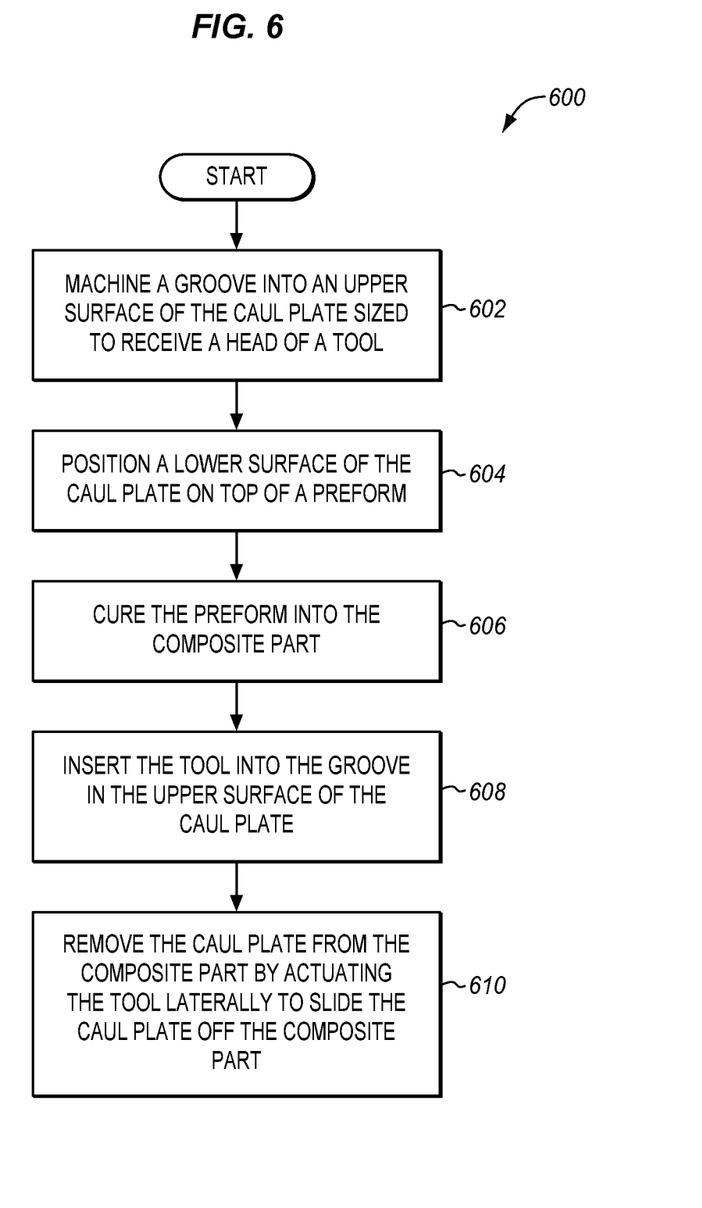
FIG. 6 is a flowchart illustrating a method for fabricating a composite part via the use of a caul plate with an integral channel in an illustrative embodiment.

FIG. 6 is a flowchart illustrating a method 600 for fabricating a composite part via the use of the caul plate 130 enhanced with the groove 160 in an illustrative embodiment. The steps of the method 600 are described with reference to the caul plate 130 of FIGS. 1-4, but those skilled in the art will appreciate that method 600 may be performed in other systems and alternative caul plates as desired. The steps of the flowcharts described herein are not all inclusive and may include other steps not shown. The steps described herein may also be performed in an alternative order.

In step 602, the groove 160 is machined into the upper surface 132 of the caul plate 130 to receive the head 352 of the tool 350. Alternatively, a structural member 450 may be attached to the upper surface 132 and/or a hole 460 machined through the structural member 450 to receive an end of the tool 350.

In step 604, the lower surface 134 of the caul plate 130 is positioned on top of the preform 110. In step 606, the preform 110 is cured to form the composite part 510. In step 608, the tool 350 is inserted into the groove 160 in the upper surface 132 of the caul plate 130. Alternatively, the tool 350 is inserted through the hole 460 of the structural member 450. In step 610, the caul plate 130 is removed from the composite part 510 by actuating the tool 350 laterally to slide the caul plate 130 off the composite part 510.

The method 600 provides a substantial benefit over prior techniques because caul plate 130 may be removed without lifting or prying, thereby avoiding damage to the composite part 510. The use of the caul plate 130 improves labor in removing the caul plate 130, and reduces overall cost of fabricating composite parts fabricated by reducing instances of scrapping parts due to damage imparted to the composite part during removal.

Although specific embodiments are described herein, the scope of the disclosure is not limited to those specific embodiments. The scope of the disclosure is defined by the following claims and any equivalents thereof.

What is claimed is:

1. An apparatus comprising:
    a tool comprising a head;
    a mandrel that retains a composite part, and includes sealing tape; and
    a caul plate for the composite part, comprising:
        a body that includes a lower surface which faces the composite part, and an upper surface that is opposite to the lower surface; and
        a groove in the upper surface to accept the tool, that is physically distinct from the caul plate, for temporary attachment, wherein the groove is configured to receive force from the head of the tool that releases the caul plate from the composite part and slides the caul plate laterally from the composite part.

2. The apparatus of claim 1 wherein:
    the groove is an indentation into the upper surface having walls to transfer a lateral force of the tool to the caul plate.

3. The apparatus of claim 1 wherein:
    the groove is an indentation into the upper surface having a shape to receive the head of the tool.

4. The apparatus of claim 1 wherein:
    a shape of the groove corresponds with a shape of the head of the tool.

5. The apparatus of claim 1 wherein:
    the tool includes a shank attached to the head to pull the caul plate laterally.

6. The apparatus of claim 1 wherein:
    the upper surface faces a vacuum bag during cure of the composite part.

7. The apparatus of claim 1 wherein:
    the caul plate is made of a rigid material.

8. A method of fabricating a composite part, the method comprising:
    providing a tool comprising a head,
    machining a groove into an upper surface of a caul plate sized to receive the head of the tool;
    positioning a lower surface of the caul plate on top of a preform;
    curing the preform into the composite part;
    inserting the tool into the groove in the upper surface of the caul plate for temporary attachment; and
    removing the caul plate from the composite part by actuating the tool laterally to slide the caul plate off the composite part, wherein the composite part is retained by a mandrel and the mandrel includes sealing tape.

9. The method of claim 8 wherein:
    the groove is an indentation into the upper surface having walls to transfer a lateral force of the tool to the caul plate.

10. The method of claim 8 wherein:
    the groove is an indentation into the upper surface having a shape to receive the head of the tool.

11. The method of claim 8 wherein:
a shape of the groove corresponds with a shape of the head of the tool.

12. The method of claim 8 wherein:
the tool includes a shank attached to the head to pull the caul plate laterally.

13. The method of claim 8 wherein:
the upper surface faces a vacuum bag during the curing.

14. An apparatus comprising:
a tool comprising a head;
a mandrel that retains a composite part, and includes sealing tape; and
a caul plate for the composite part, comprising:
   a body that includes a lower surface which faces the composite part, and an upper surface that is opposite to the lower surface;
   a structural member directly protruding from the upper surface; and
   a hole in the structural member to receive the tool, that is physically distinct from the caul plate, for temporary attachment, wherein the hole is configured to receive force from the head of the tool that releases the caul plate from the composite part and slides the caul plate laterally from the composite part, wherein the body is U-shaped, with side members and a base member forming the body, and the structural member comprises a fin protruding vertically from the base member to align with a stringer of an aircraft.

15. The apparatus of claim 14 wherein:
each of the side members is integral with the base member.

16. The apparatus of claim 14 wherein:
the hole extends through the structural member to transfer a lateral force of the tool to the caul plate.

17. The apparatus of claim 16 wherein:
the tool includes a hook to insert through the hole to pull the caul plate laterally.

18. The apparatus of claim 16 wherein:
the tool includes a pin to insert through the hole to pull the caul plate laterally.

19. The apparatus of claim 14 wherein:
the structural member is integrated with the body of the caul plate.

20. The apparatus of claim 19 wherein:
the structural member and the body are made of a rigid material.

21. The apparatus of claim 1 wherein:
the groove is bounded by a floor that is sunken into the body.

22. The apparatus of claim 1 wherein:
the groove is disposed within a region of a tapered edge at the caul plate.

23. The apparatus of claim 1 wherein:
the caul plate is made of an elastically deformable shape memory material.

24. The apparatus of claim 14 wherein:
the hole comprises a hole indentation.

25. The apparatus of claim 14 wherein:
the hole is disposed within a region of a tapered edge at the caul plate.

26. The apparatus of claim 14 wherein:
the caul plate is made of an elastically deformable shape memory material.

* * * * *